July 14, 1959     E. DICK     2,894,636
FRAME OR HOLDER FOR A COFFEE BAG
Filed May 22, 1957

INVENTOR
EMANUEL DICK
BY
ATTORNEY

2,894,636

FRAME OR HOLDER FOR A COFFEE BAG

Emanuel Dick, New York, N.Y.

Application May 22, 1957, Serial No. 660,822

6 Claims. (Cl. 210—471)

My invention relates to coffee urns and is directed particularly to an improved ring for supporting the strainer bag in coffee urns of the type commonly used in diners and restaurants.

The principal object of my invention is to provide an improved strainer bag ring of the above nature which is formed of a metal rod and which embodies an integral handle for lifting the bag in or out of the coffee urn with ease and dependability.

Another object of my invention is to provide a strainer bag ring of the character described upon which the coffee bag can readily be assembled or removed by disconnection of a peripheral joint in the ring structure.

Another object of my invention is to provide a strainer bag ring of the above nature wherein the interlocking peripheral joint is of superior strength so that a strainer bag heavily filled with coffee grounds can be easily removed from the urn without danger of accidental spilling.

Other objects, features and advantages of my invention will be apparent from the following description when read with reference to the accompanying drawing, wherein.

Figure 1:
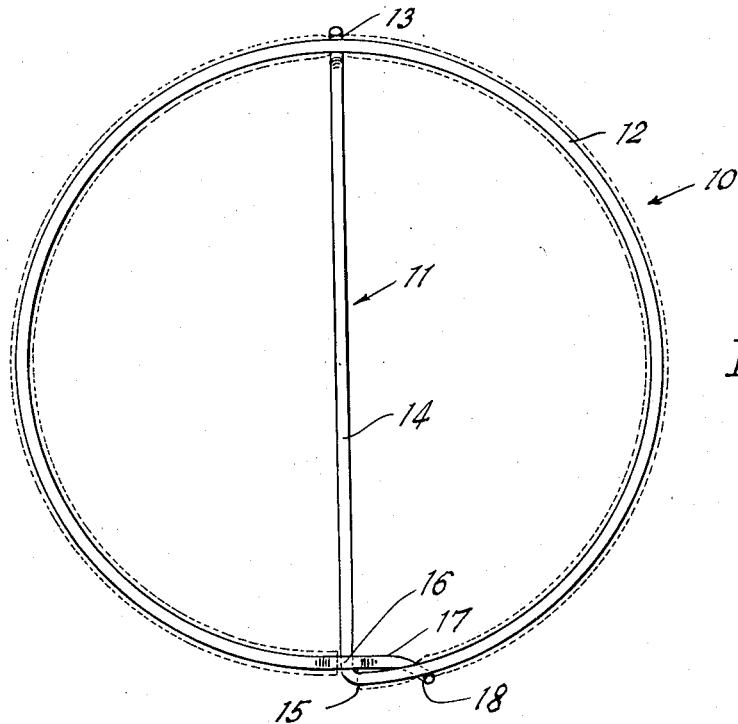
Fig. 1 is a top view of an improved strainer bag ring embodying the invention.

Referring now in detail to the drawings, my improved strainer bag ring, generally denoted by the reference numeral 10, is integrally formed of a resilient metal, such as stanliess steel, or hardened aluminum, into a vertical handle portion 11 and a horizontal circular ring portion 12. The handle portion 11 has an open end formed into an upturned hook 13 adapted to releasably fit under the ring portion 12, as hereinafter described. Extending from the hook 13, the handle portion 11 is shaped into an arcuate handle portion 14 which terminates at a right-angularly formed juncture portion 15 with the circular ring portion 12. The open end terminus of the ring portion 12 comprises a connector joint with the juncture portion 15 thereof, and is formed with an upwardly bent hump 16 which continues into a short, forwardly-extending portion 17, the end of which is bent into a short obliquely outwardly-extending portion 18.

Figure 2:
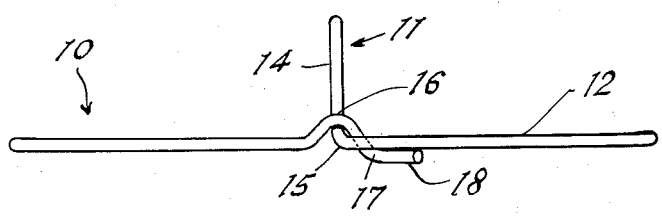
Fig. 2 is an elevational view of the strainer bag ring showing the interlocking joint structure.
Figure 3:
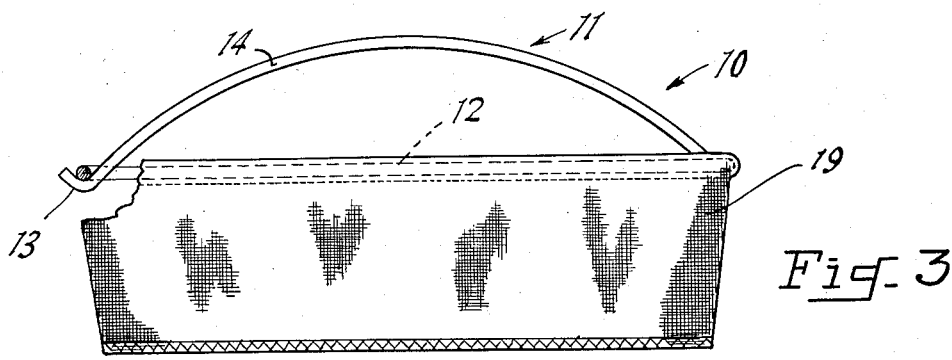
Fig. 3 is an elevational view of the strainer bag ring and bag assembly, with portions broken away to show how the free end of the handle hooks under the ring at a point diametrically opposite the interlocking joint.

Connection of the ring joint at the open end of the circular ring portion 12 and the juncture portion 15 thereof, as illustrated in Figs. 1 and 2, is accomplished simply by springing said open end inwardly and upwardly so that the hump portion 16 thereof engages over the inner end of the handle portion 14, after which the forwardly-extending portion 17 is pushed down to spring under the circular ring portion 12 at a position slightly spaced from the juncture portion 15. By virtue of this over-and-under interlocking of the ring structure, the connection thus formed is especially strong with respect to downward vertical forces, so that any danger of disconnection or bending upon carrying heavy loads of coffee grounds in the strainer bag is minimized. As illustrated in Figs. 1 and 3, after connection of the ring structure joint as described above, the hook 13 at the outer end of the handle portion 14 will be hooked under the ring portion 12 at a position approximately diametrically opposite the juncture portion 15, which by restraining inward flexing of the open end of the ring portion 12, further constrains against accidental disconnection of the ring structure joint, especially when a heavy load is being carried.

The usual coffee strainer bag 19 can readily be applied to the ring 10 by threading it on the open end of the ring portion 12 over the outwardly-extending end portion 18 thereof when the ring is in disconnected condition. The strainer bag is not shown in Figs. 1 and 2 for simplicity of illustration.

While I have described a preferred embodiment of my invention, it is to be understood that this disclosure is for the purpose of illustration only and that various changes in the arrangement of parts, as well as the substitution of equivalent elements for those herein shown and described, may be made without departing from the spirit and scope of the invention as set forth in the appended claims.

What I claim as new and desire to secure by Letters Patent is:

1. A holder ring for coffee urn bags comprising an integrally formed length of heavy, resilient wire, said wire length being formed with a vertically-extending handle portion, a horizontal circular ring portion integrally joined with one end of said handle portion and substantially encompassing said handle portion, means at the end of said circular ring portion for hooking interconnection with said ring portion at the juncture of said ring portion with said handle portion, said interconnection means comprising a hump adapted to fit over said one end of said handle portion, a short forwardly-extending portion extending from said hump, and an obliquely outwardly-extending portion adapted to fit under said circular ring portion at a point near said juncture, and means at the open end of said handle portion for connection with said circular ring portion at a position therealong opposite said juncture.

2. The device according to claim 1 wherein said connection means comprises an upwardly-directed hook.

3. A ring for holding strainer bags for use with coffee urns comprising an integrally formed length of heavy, resilient wire, said length of wire being formed with an arcuate, upwardly-extending handle portion, a horizontal circular ring portion integrally joined with one end of said handle portion and substantially encompassing said handle portion, means at the end of said circular ring portion for hooking interconnection with said ring portion at the juncture of said ring portion with said handle portion, said interconnection means comprising a hump adapted to fit over said one end of said handle portion, a short forwardly-extending portion extending from said hump, and an obliquely outwardly-extending portion adapted to fit under said circular ring portion at a point near said juncture.

4. The device according to claim 3 wherein the other end of said handle portion, opposite said juncture, is formed with connection means for connecting said end to said circular ring portion, said connection means comprising an upwardly-directed hook.

5. A ring for holding strainer bags for use with coffee urns comprising an integrally formed length of heavy, resilient wire, said length of wire being formed with an arcuate, upwardly extending handle portion, a horizontal circular ring portion integrally joined with one end of said handle portion and substantially encompassing said handle portion, means at the end of said circular ring portion for hooking interconnection with said ring portion at the juncture of said ring portion with said handle portion, said interconnecting means comprising a hump adapted to fit over said one end of said handle portion, and an obliquely, outwardly extending portion adapted to fit under said circular ring portion at a point near said juncture.

6. A device according to claim 5, and means at the other end of said handle portion for connection with said circular ring portion at a position therealong opposite said juncture.

References Cited in the file of this patent
UNITED STATES PATENTS

| | | |
|---|---|---|
| 1,028,114 | Holton | June 4, 1912 |
| 1,536,679 | Markowski | May 5, 1925 |
| 1,750,239 | Mills | Mar. 11, 1930 |
| 1,863,418 | Sieling | June 14, 1932 |